Figure 1:
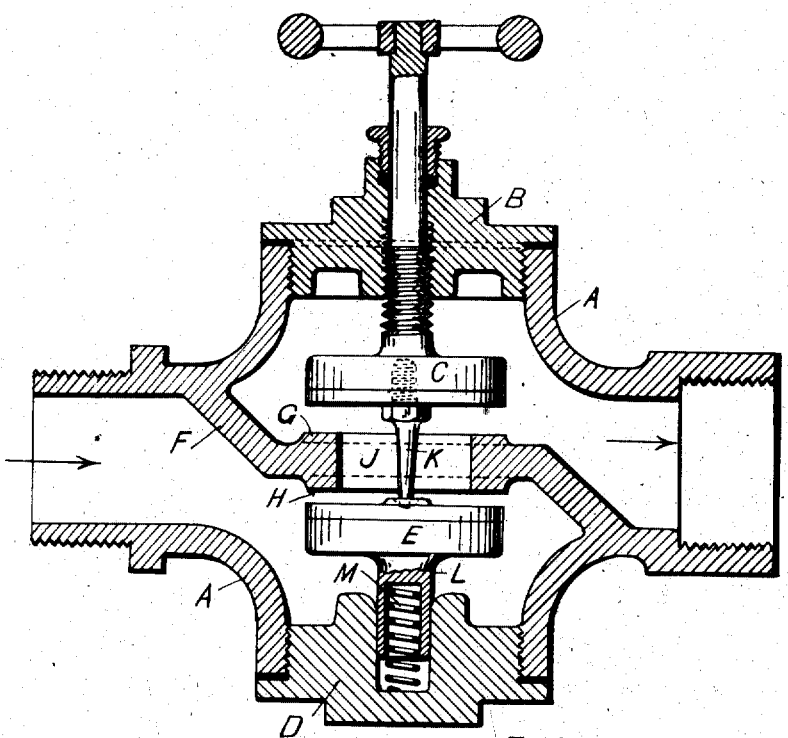

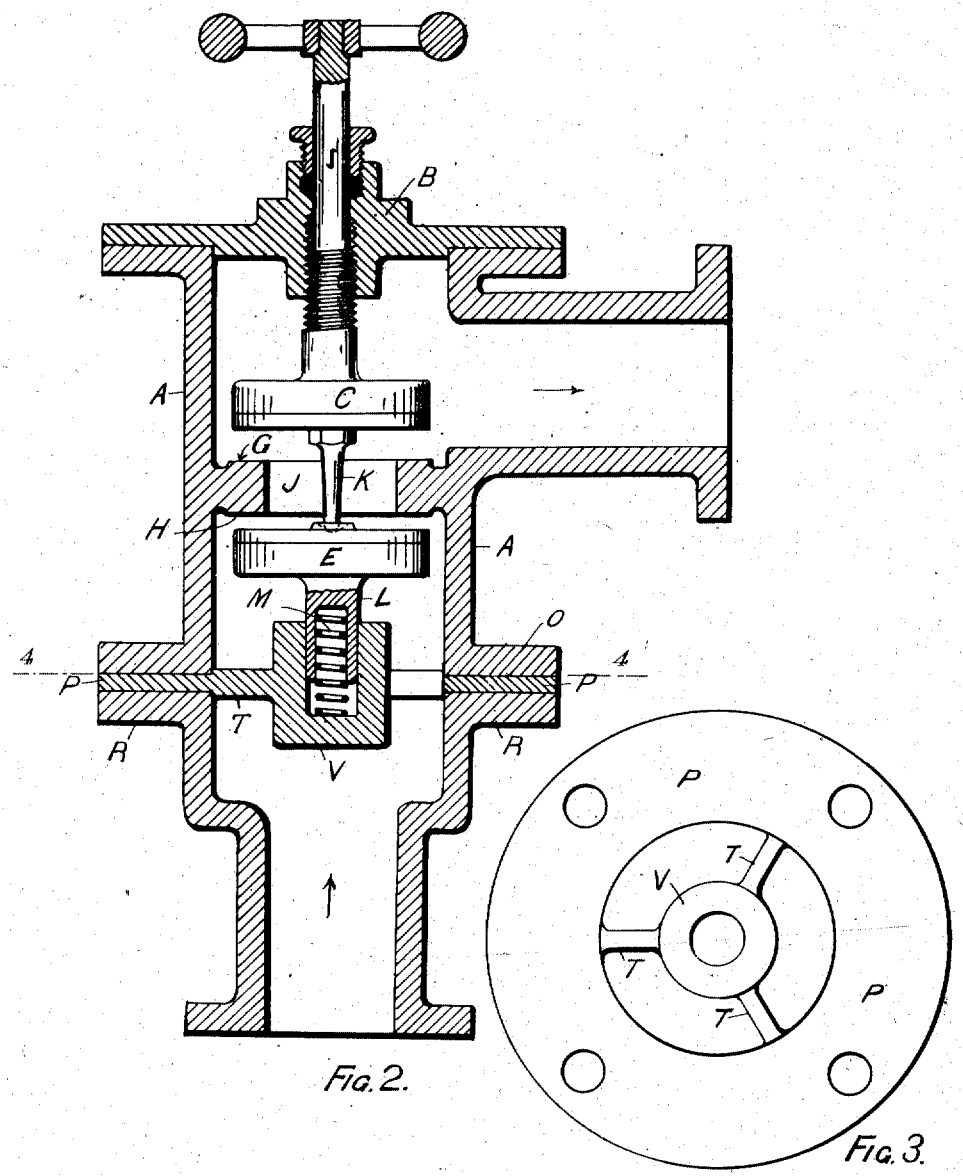

UNITED STATES PATENT OFFICE.

JOHN THOMAS SHELDON, OF FERNHILL, NEW SOUTH WALES, AUSTRALIA.

STOP-VALVE AND TAP.

1,002,000.

Specification of Letters Patent. Patented Aug. 29, 1911.

Application filed February 1, 1910. Serial No. 541,272.

*To all whom it may concern:*

Be it known that I, JOHN THOMAS SHELDON, a subject of the King of Great Britain and Ireland, residing at "Olgate," Fernhill street, Fernhill, in the State of New South Wales, Commonwealth of Australia, have invented certain new and useful Improvements in Stop-Valves and Taps, of which the following is a specification.

The purpose of this invention is to provide a simple and effective means of preventing the escape of water, steam or other fluid normally controlled by a valve, when the cover thereof is removed, in order that the internal parts and mechanism may be withdrawn for examination, replacement or repair. The means which I provide to effect this object consist of a secondary valve on the side of the seat remote from the main or operating valve, so constructed and arranged that it will close on the underside of the seat only when the main valve is sufficiently withdrawn. The secondary valve which is inserted through an aperture provided in the underside of the valve body or casing (afterward closed by suitable means) is constructed preferably with a stem designed to carry a spring for the purpose of insuring the closing of the said valve on its seat as the main valve is withdrawn. The latter is provided upon its underside with a projecting pin so placed that when it (the valve) is closed on its seat or is opened to any degree up to the point of permitting the passage of a full bore of fluid, the said pin will bear upon the face of the secondary valve and prevent it from closing the orifice, but on the further withdrawal of the main valve, will permit the secondary valve to close the orifice, and to be retained on its seat by the fluid pressure supplemented by the spring. But in order that my invention may be fully understood I shall now refer to the accompanying drawings which represent sections of complete valves of different forms constructed on the principle herein described.

Figure 1 illustrates a straight through valve constructed with flat seats and valves faced with any suitable material, but it is obvious that the invention is applicable to miter valves and seats or other forms. Fig. 2 represents a section of a right angle valve and Fig. 3 is a plan on line 4, 4, Fig. 2.

I will refer firstly to the form of valve shown in Fig. 1:—The valve casing is indicated by A and is provided with a cover B for the insertion of the main valve C and a plug or cover D for the insertion of the secondary valve E. A diaphragm F divides the casing and is provided with opposing seats G and H surrounding, and concentric with, the aperture J which may be closed by either of the valves. A pin K projects from the underside of the main valve, bearing upon the face of the secondary valve and is of such a length as will, when the main valve is in a position as to permit a full flow of fluid, retain the secondary valve at a similar distance from its own seat (as shown), but will allow it to close gradually on its seat as it (the main valve) is further withdrawn. The secondary valve is provided with a stem L arranged to slide in a cavity provided in the plug D, and a spring M is fitted within the stem for the purpose hereinbefore stated. If considered preferable the secondary valve may be operated by means of a screw or other method in place of the spring, but for water taps and the like the spring device, rendering the action automatic, will be found most suitable. It will be noted that the valve as illustrated in Fig. 1 is designed to be arranged so that the flow of fluid is in the direction indicated by the arrow heads, but if the cover B and the plug D are made interchangeable the valve may be arranged so that the flow is in the opposite direction.

Referring now to Figs. 2 and 3:—the same letters of reference as in Fig. 1 have been used to indicate similar parts of the valve but in order to support and guide the secondary valve, E, a ring flange or washer P is inserted between the flange O and the connecting pipe flange R provided with a cross-bar T carrying the boss V for the reception of the valve stem L and spring M, similarly to the plug D, Fig. 1. Obviously the distance pin K would perform its function equally well if its position were reversed so that it may, if desired, be secured to the supplementary and bear against the face of the main valve.

By this simple device the whole of the internal operative mechanism of a stop valve or tap may be withdrawn from the casing, without the necessity of shutting off the fluid at some distant point, the screwing back of the main valve a sufficient distance permitting the secondary valve to close on its seat, thereby preventing the escape of the fluid through the aperture exposed by removal of the cover.

What I claim is:—

1. The combination with a valve casing flanged at its lower end and having a removable cover and an apertured partition, and a pipe below and flanged for connection with the lower flanged end of the casing, of a disk valve in the casing adapted to seat on one face of the partition, said valve having its stem projecting through the cover, and provided with a pin projecting from its lower face, a guide having an opening therethrough and secured between the flanges of the casing and pipe and having a recessed boss, a secondary disk valve below the partition and adapted to seat on the lower face of said partition, said valve having a hollow stem projecting into the recess of the boss of the guide plate, and a spring in the said hollow stem.

2. The combination with a valve casing flanged at its lower end and having a removable cover and an apertured partition, and a pipe flanged at its upper end for connection with the lower flanged end of the casing, of a valve in the casing adapted to seat on the upper face of the partition, said valve having its stem projecting through the cover, a guide plate secured between the flanges of the casing and pipe and having a central recessed boss, a secondary valve below the partition adapted to seat on the lower face of the said partition, said secondary valve having a hollow stem projecting into the recess of the said boss, a spring in the hollow stem, and a pin secured to and projecting from the face of one valve and loosely engaging the opposing face of the other valve.

3. A valve, comprising a casing having a removable cover and provided with an apertured partition and a removable recessed member at the side of the partition opposite from that of the cover, a main disk valve adapted to be seated on one face of the partition, said valve having a stem rigidly secured thereto and projecting through the cover and a pin projecting from its opposite face, a secondary disk valve adapted to seat on the opposite face of the partition, said secondary valve having a shallow recess in one face to receive the pin of the main valve and a hollow stem projecting from its other face into the recess of the removable member and guided thereby, and a spring in the hollow stem of the secondary valve.

Signed at Sydney, New South Wales, Australia, this seventeenth day of December, 1909.

JOHN THOMAS SHELDON.

In the presence of—
CHARLES HATTON,
WILLIAM NEWTON.